(No Model.)

J. R. WAGNER.
MECHANICAL MOVEMENT.

No. 419,089. Patented Jan. 7, 1890.

Witnesses
Chas. J. Williamson.
Henry C. Hazard.

Inventor
John R. Wagner, by
Prindle & Russell, his Atty

UNITED STATES PATENT OFFICE.

JOHN R. WAGNER, OF LUZERNE, ASSIGNOR TO ECKLEY B. COXE, OF DRIFTON, PENNSYLVANIA.

MECHANICAL MOVEMENT.

SPECIFICATION forming part of Letters Patent No. 419,089, dated January 7, 1890.

Application filed May 11, 1889. Serial No. 310,451. (No model.)

*To all whom it may concern:*

Be it known that I, JOHN R. WAGNER, of Drifton, in the county of Luzerne, and in the State of Pennsylvania, have invented certain new and useful Improvements in Mechanical Movements; and I do hereby declare that the following is a full, clear, and exact description thereof, reference being had to the accompanying drawings, in which—

Figure 1:
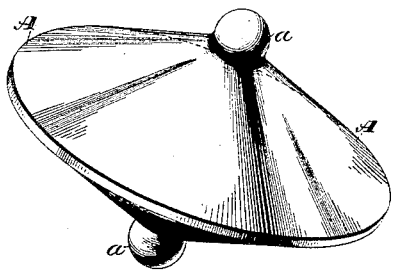
Figure 2:
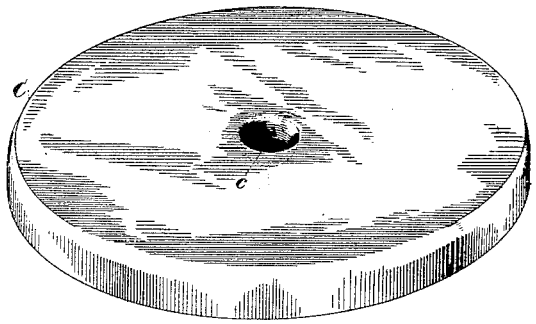
Figure 3:
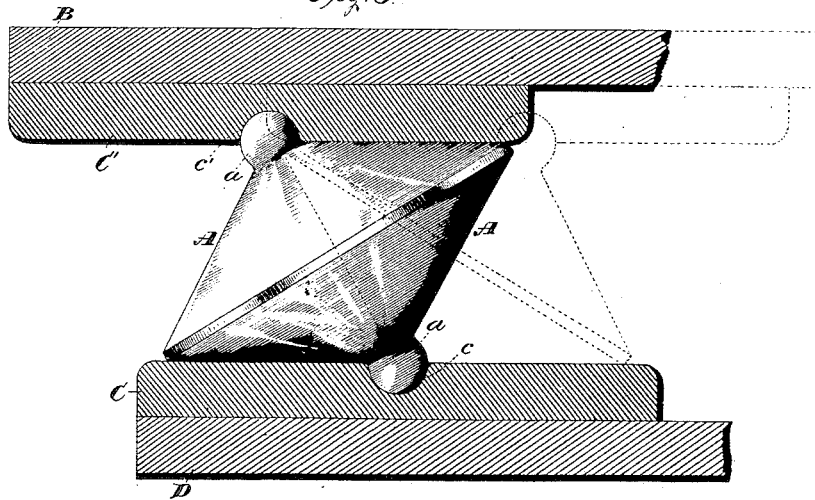

Figure 1 is a perspective view of my improved conical roller separated from its bearings. Fig. 2 is a like view of one of the roller-bearings, and Fig. 3 is a side elevation of said roller and a section of the bearings with which it is combined.

Letters of like name and kind refer to like parts in each of the figures.

This invention is an improvement upon a mechanism for which Letters Patent No. 369,233 were issued upon the 11th day of August, 1887, and relates to the construction of the cone-rollers employed therein; and to such end said invention consists in the form of the roller and its bearings and their combination with each other, substantially as and for the purpose hereinafter specified.

In the carrying of my invention into practice I employ a roller A, which has the general form of two cones that are joined together at their bases, and at each end of the same I form a spherical boss $a$, that is in a line with and forms an extension of the axis of said roller. The roller A is intended for use with other like rollers in forming a gyrating support for a plate B or other like part, and for such purpose rests upon a bearing C, that preferably is separately formed and afterward secured to a base D, but may, if desired, be formed of or upon said plate. Said bearing is circular in form and at its center is provided with a recess $c$, which is spherical in form and corresponds in size to and is adapted to receive one of the bosses $a$ of said roller. A second bearing C', corresponding to the bearing C, is secured to or formed upon the lower face of the plate B and rests upon a portion of the roller A, which roller, as seen in Fig. 3, engages with the faces of said bearings at relatively-opposite sides of its sections. If, now, the plate B is moved horizontally, so as to cause the roller A to roll upon the lower bearing C, the upper bearing C' will have rolling contact with the upper portion of said roller and travel around the same, so as to receive and communicate to said plate B a gyratory motion in a plane parallel with the plane of the base D, or at a right angle to the axes of said bearings C and C'. The conical faces of the roller A have rolling contact only with the faces of the bearings C and C', and if the gyratory motion were sufficiently slow there would probably be no tendency to the displacement of parts were the ends of said roller plain cones; but in consequence of the engagement of the spherical bosses $a$ and $a$ with their recesses $c$ and $c'$ any tendency which may exist is effectually counteracted, and it is impracticable to cause displacement without the breakage of some of the parts. The contact between said bosses and sockets is partly rolling and partly sliding; but the amount of motion is so small as to cause no appreciable friction.

If desired, the spherical boss and recess may be employed upon one end only of the roller, and its opposite end have a plain conical form or any other form desired.

Having thus described my invention, what I claim is—

1. As an improvement in means for producing a gyratory motion in a horizontal plane, a double-cone roller which is provided at its end with a spherical boss, in combination with a circular bearing that has a spherical recess which is adapted to receive and contain such boss, substantially as and for the purpose specified.

2. As an improvement in means for producing gyratory motion in a horizontal plane, a double-cone roller which is provided at each end with a spherical boss, in combination with two circular bearings that are relatively formed upon or attached to a base and to the part to be gyrated, and are each provided with a recess which conforms to and is adapted to receive one of said spherical bosses, substantially as and for the purpose shown.

In testimony that I claim the foregoing I have hereunto set my hand this 7th day of May, 1889.

JOHN R. WAGNER.

Witnesses:
HARRY J. DAVIS,
ELLIOTT A. OBERRENDER.